United States Patent [19]

Smith

[11] 3,794,909
[45] Feb. 26, 1974

[54] APPARATUS FOR AND METHOD OF SENSING PARTICULATE MATTER
[75] Inventor: Thomas B. Smith, Brighton, Mass.
[73] Assignee: Ikor Incorporated, Burlington, Mass.
[22] Filed: Dec. 8, 1971
[21] Appl. No.: 205,784

[52] U.S. Cl. ............... 324/32, 324/71 R, 73/194 F, 73/28
[51] Int. Cl. ............................................. G01r 5/28
[58] Field of Search......... 324/32, 33, 71 CP; 73/28, 73/194 F, 421.5 R, 421.5 A, 422

[56] References Cited
UNITED STATES PATENTS
3,359,796  12/1967  Dimick ................................. 324/32
3,258,634  6/1966  Rich..................................... 324/32

OTHER PUBLICATIONS
R. L. Solnick–Sampling Particulate Matter–The Oil and Gas Journal–10/15/56, pp. 120–124.
M. S. Beck–Electrostatic Charge Measurement of Particulate Materials Being Transported at High Velocity–Proceedings of the Conference on Dielectric Materials Measurements and Applications–July, 1970, pp. 38–41.

Primary Examiner—Michael J. Lynch
Attorney, Agent, or Firm—Schiller & Pandiscio

[57] ABSTRACT

This invention concerns sensing particulate matter entrained in a gas flow that is isokinetically sampled. The sample is flowed past an ungrounded electrode with which the particles in the sample impact and transfer electrical charge. The sample also flows past a grounded electrode to complete a circuit. Measurement is made of the minute current flow in the circuit, which current is linear with respect to the square of the average velocity of the particles impelled by the gas flow.

3 Claims, 4 Drawing Figures

APPARATUS FOR AND METHOD OF SENSING PARTICULATE MATTER

This invention relates to the sensing of particles in a fluid stream, and more particularly to monitoring particulate matter contained in gas streams, as in the stack discharge from incinerators, electric utility generators and the like.

In many cases, air pollution is not only created by the discharge of gases per se into the atmosphere but also by particulate matter in the gas stream. While efforts have been made to control particle emission, as by filtering and precipitation techniques, it has been difficult to ascertain accurately the effectiveness of such anti-pollution control equipment.

In order to determine the extent of pollution by particle emission, or to determine how effective anti-pollution control equipment may be, it is desirable to provide a system capable of monitoring particle emission in a gas stream on a substantially continuous basis.

Monitors have long been known which collect or sample particulate matter from a main stream, usually in a filter so that the collected matter can later be weighed. If the sampling technique provides samples which are proportional to the concentration of matter in the main stream, one can thereby determine that concentration from the weight of the collected sample and the volume of gas passed through the filter. U.S. Pat. No. 1,100,171 typifies such prior art, but unfortunately is a "batch" process which does not lend itself to continuous monitoring, nor is it sensitive to very small amounts of particulates in large volumes of gas.

One can detect the presence of particulate matter in the gas flow by optical techniques which are highly dependent upon the size of the particles, the reflectivity of the particles and the speed with which the particles are moved by the gas stream past the detector, all parameters having very wide ranges. Consequently, optical methods are quite limited in the scope of their application.

It is well known that one can detect the presence of particulate matter in the gas flow by passing the gas between a pair of electrodes across which an electrical potential is maintained, ordinarily at a level somewhat lower than will sustain a corona discharge for the dielectric properties of that gas. This technique depends upon the change in dielectric properties between the electrodes due to the introduction of particulate matter, because changes in the dielectric may cause a large current to flow between the electrodes.

Such electrical techniques of course, require substantial voltage sources, are hazardous where the gases and/or particles are explosive, and have been found to have limited sensitivity in the detection of very small quantities of particulates in a gas stream.

Regardless of the detection method used, in order to obtain a truly representative sample of a gas flow, the sample should be taken isokinetically, i.e., introduced into the sampling system without substantial perturbation of the kinetics of the gas being sampled. A number of isokinetic sampling systems have been proposed but are not believed to provide sampling of sufficient precision when very small quantities of particulates in very large amounts of gas are involved.

A principal object of the present invention is to provide a method of and apparatus for accurately determining the flow rate and for the concentration of particulate matter in a gas stream. Yet another object of the present invention is to provide such method and apparatus wherein isokinetic sampling can be achieved with a high degree of precision. Yet another object of the present invention is to provide an improved and simplified, yet highly sensitive, detector for the presence of particulate matter in a gas flow. Another object of the present invention is to provide a system so highly sensitive that it can be employed as a high volume sampler for monitoring ambient air quality.

The foregoing and other objects of the present invention are generally achieved by providing a sampling tube having an orifice disposed substantially normally to the flow of a main gas stream being sampled, a Pitot tube arrangement disposed adjacent the sampling orifice for measuring a pressure differential indicative of the velocity of the main gas stream, and a Venturi type arrangement within the tube adjacent the orifice for measuring a pressure differential indicative of the velocity of a sampled gas stream in the tube, both pressure-measuring arrangements being exposed thereby to substantially the same ambient temperature which is also measured. The particulates are detected by providing at least a pair of normally uncharged, spaced electrodes disposed to permit flow therebetween of at least a part of the sampled gas stream containing a correspondingly proportional amount of particulate matter therein. Means are provided for measuring across the electrodes minute electrical current which is due to the triboelectric properties of particles moving in a gas stream, and for measuring the temperature of the gas stream adjacent the electrodes. From the data thus obtained, one can determine the weight of particulates per unit time flowing in the gas stream and also the concentration of particulates.

Other objects of the present invention will in part be obvious and will in part appear hereinafter. The invention accordingly comprises the method comprising the several steps and the relation and order thereof, and the apparatus possessing the features, properties and relation of elements, all of which are exemplified in the following detailed disclosure and the scope of the application of which will be indicated in the claims.

For a fuller understanding of the nature and objects of the present invention, reference should be had to the following detailed description taken in connection with the accompanying drawing wherein.

Figure 3:
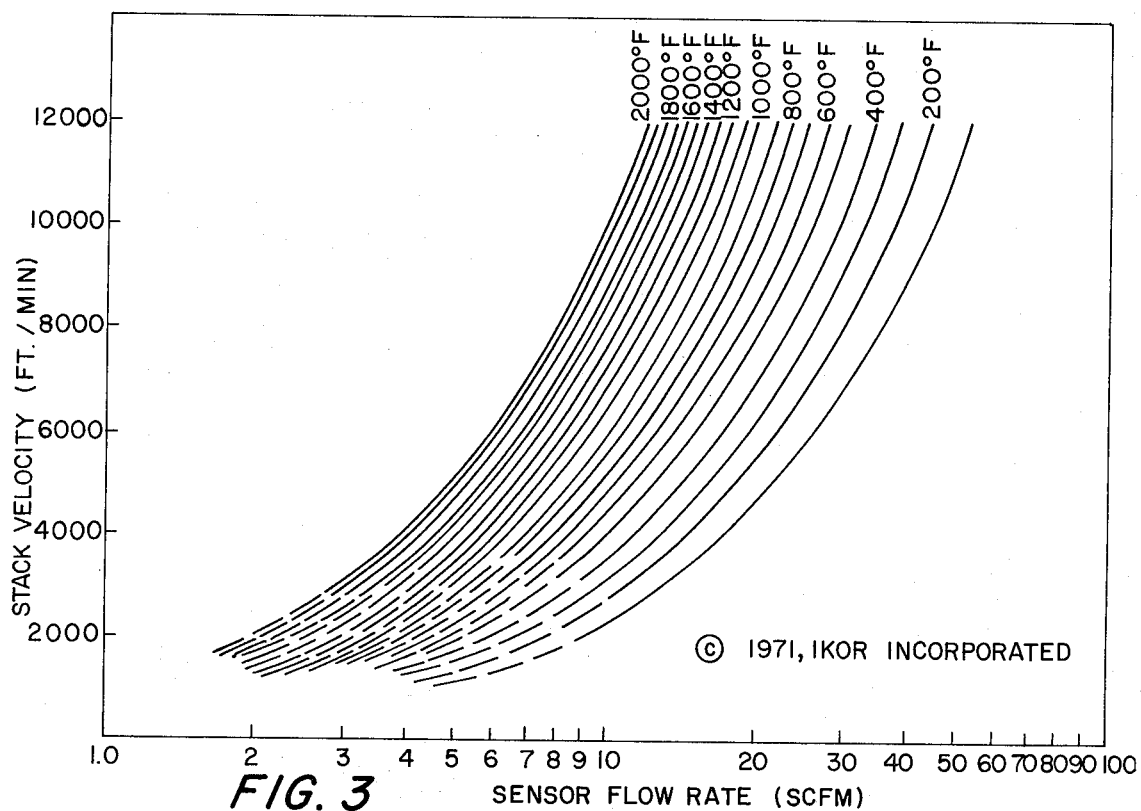
Figure 4:
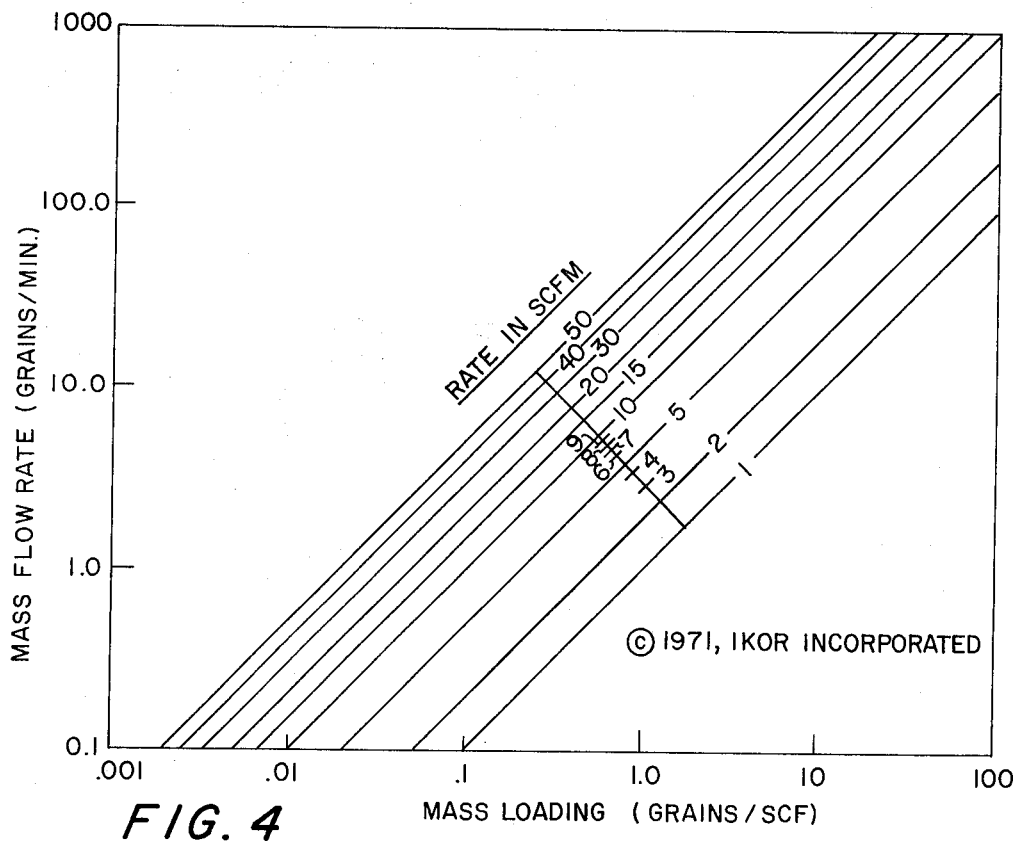

FIG. 3 is a graphical representation showing a number of curves, each for a different temperature of the relationship of stack velocity in feet/minute vs. flow rate in standard cubic feet/minute through a sensor of the invention; and FIG. 4 is a graphical representation showing a number of curves, each for a different standard mass flow rate, of the relationship of mass flow rate in grains/min. vs. mass loading in grains/standard cubic foot.

Figure 1:
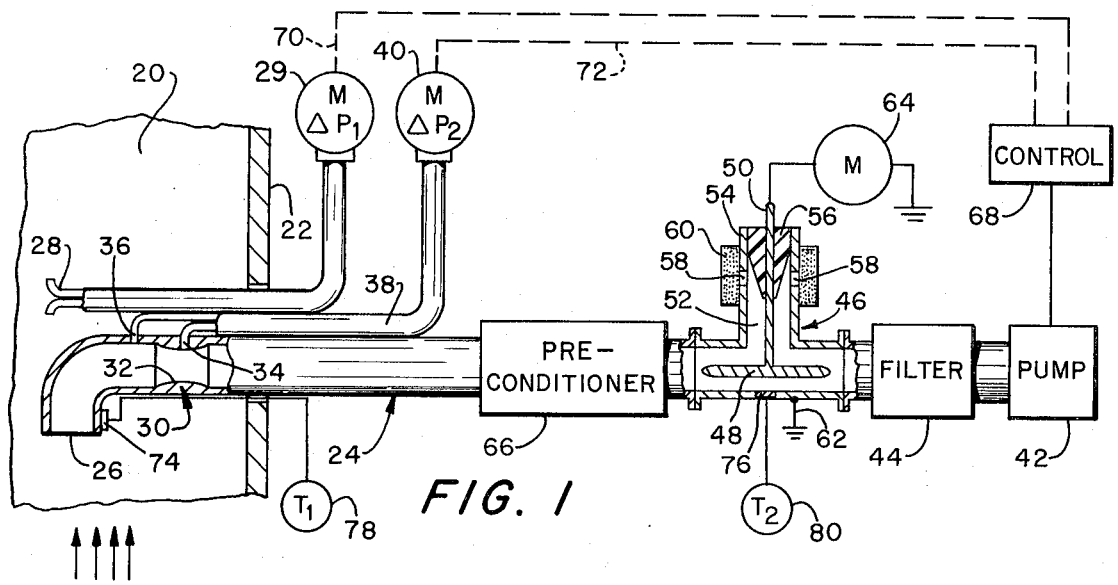
FIG. 1 is a diagram, partly in block, partly broken away, and partly in fragment, showing the combination of elements embodying the principles of the present invention.

Referring now to FIG. 1 there is shown means for sampling a gas stream which, for example, flows in a stack exemplified by a fragment 20 and having a wall 22 extending substantially parallel to the direction of the flow of gas (indicated by the arrows) containing entrained particulate matter. The sampling means comprises a hollow, tubular probe 24 having an orifice 26 at one end thereof, the orifice preferably being disposed across or normal to the direction of the gas flow so that the gas impinging on the orifice will enter the hollow interior of sampling tube 24. In the preferred form, the probe is formed of stainless steel so as to reduce the corrosive effects of the stack gas. To insure a large gas flow, the inside diameter of the sampling nozzle of probe 24 is preferably around 0.9 inches except at the location of a Venturi-type constriction to be described hereinafter.

Positioned adjacent orifice 26 but downstream therefrom so as to avoid perturbing the kinetics of the gas entering orifice 26, is an S-type Pitot tube 28 having the usual pair of arms or openings, one positioned to face into the main gas stream, the other positioned to face away from the main gas stream. The arms of Pitot tube 28 extend substantially parallel to tube 24 through wall 22 to the exterior of stack 20 and are connected to a device such as meter 29 which determines and displays the pressure differential $\Delta P_1$ across two arms of the Pitot tube. For a given temperature, it is known that $\Delta P_1$ is proportional to the square of the velocity of the gas flow. Positioned within tube 24, downstream from orifice 26 is a Venturi arrangement 30 within tube 24, the arrangement comprising a restricted portion or throat 32 having the usual appropriately designed tapers at inlet and outlet to minimize turbulence, and a pair of openings, one into throat 32 at 34, the other 36 being in tube 24 just upstream from throat 32. Both openings 34 and 36 are attached to appropriate tubing 38 which in turn is connected to a second device such as meter 40 for detecting the differential pressure $\Delta P_2$ across openings 34 and 36 and for displaying same. Venturi arrangement 30 is preferably close enough to orifice 26, so that the temperature of gas forced through throat 32 is substantially at the same ambient temperature as the gas entering orifice 26 and the gas flowing past Pitot 28. Again, it is known that $\Delta P_2 \sim V^2$, where V is the velocity of the gas flow through the venturi.

Tube 24 is of sufficient length so as to extend through wall 22 such that orifice 26 can be positioned substantially centrally in stack 20, i.e., at a position of substantial gas flow with preferably a minimum of turbulence due to wall effects. At the opposite end of tube 24 there is positioned a pump, shown schematically at 42. Pump 42 preferably is a high capacity, variable speed motor/blower which is capable of drawing gas through tube 24 from orifice 26 over a very wide range of gas velocities, typically, for example, from one to several thousand feet per minute. Positioned adjacent the inlet to pump 42 from tube 24 is a filer 44, preferably a high efficiency, glass fiber filter, capable of retaining all particles, for example, above 0.3 microns. Such a filter is preferably removable so that the weight difference of the filter after a specific pumping interval or after passage of a known volume of gas therethrough, can be readily determined. Filter 44 is however optional in the device shown, although it is useful to calibrate the device.

In order to electrically sense the particulate matter traversing tube 24 in the sampled gas stream, the invention includes novel sensing device 46. The latter, in the form shown, constitutes a pair of electrodes, one of which is typically formed as a cylindrical, smooth-surfaced metallic element or bullet 48, for example 2 to 3 inches long and one-half inch in diameter, positioned coaxially within tube 24 and annularly spaced typically about one-fourth inch from the latter. A supporting lead or rod 50 is provided extending from bullet 48 substantially perpendicularly to the axis of tube 24 and outwardly of the latter through opening 52 in a side wall thereof. Rod 50 and bullet 48 are preferably formed of an electrically conductive material such as stainless steel or the like. In order to support rod 50 and bullet 48 in their operative positions, the device includes tube 54 which is fitted into tube 24 at opening 52 and sealed therein at their common joining edges. Rod 50 is suspended coaxially within tube 54 and held in that position by a mass of insulating material 56. The latter is preferably shaped substantially as a cone having its apex directed toward bullet 49 and its base sealed around the edge thereof to tube 50. A plurality of bleed holes 58 are provided, preferably disposed symmetrically around tube 50 so as to permit the interspace therein between tube 54 and conical surface of insulator 56, to communicate pneumatically with the air on the outside of the system. In order to avoid the entrainment of any particulate matter into air pulled in through bleed holes 58 by the action of pump 42, the bleed holes are preferably surrounded by an annulus 60 of filter material.

The other electrode of the sensor is typically formed of the interior wall of an electrically conductive portion of tube 24 itself. As shown, the wall of tube 24 is connected, as by lead 62 to ground. Rod 50 is connected to a current measuring instrument such as meter 64, the circuit through meter 64 being completed to ground.

In a preferred form of the invention, there is included, between venturi 30 and sensor 46, means, as shown schematically as preconditioner, shown as block 66, for heating the gas traversing tube 24, well after it has passed through venturi 30, to a temperature above the dew point, thereby eliminating any problems which might occur by the condensation of moisture into droplets within the sensor which droplets might be sensed as particles. Thermocouples 74 and 76 are respectively located for sensing the temperature of the gas entering orifice 26 and the temperature of the gas passing through sensor 46. Thermocouples are respectively connected to meters 78 and 80 for displaying the sensed temperatures.

In operation, probe tube 24 may be either permanently emplaced within stack 20 or may be temporarily projected through an opening in wall 22, or may actually be used in free air as an air quality sampler, according to the needs of the operator. Tube 24 is positioned so that orifice 26 faces directly into the flow stream of the gases traversing stack 20. Pump 42 is turned on to provide temporarily fixed pumping volume and the system allowed to equilibrate. When the differential pressure reading on meters 29 and 40 have settled, the volume being pumped by pump 42 through tube 24 can now be changed until the differential pressure indicated on meter 40 matches that displayed on meter 29. At that point, the sample of gas traversing sensor 46 is isokinetic and no further adjustments need be made, as for any temperature variations.

Gas passing through tube 24 and around bullet 48 and containing particulate matter will create a current flow of magnitude typically in the nanoampere range and below, to occur between the electrodes, and such current flow is detected on meter 64. The latter must have the requisite sensitivity to such very low currents and hence usually includes an input amplifier with a leakage current preferably less than 0.01 picoamperes. The flow of current is, unlike the logarithmic dependence of current in devices of the type employing a high potential imposed between the electrodes, linearly dependent upon the mass flow rate of the particulate matter between the electrodes.

It is quite important that particulate matter does not collect on either bullet 48 or around the edge of opening 52, because such collection will not only unduly impede the flow of sample gas through tube 24 but if the particulate matter collects in sufficient quantity, it may short circuit the electrodes. To this end, bullet 48 is smooth-surfaced. Further, the presence of opening 52 would ordinarily serve to introduce eddys and therefore stagnant areas which would tend to favor particle deposition. However, it will be seen that the provision of the bleed holes 58 insures that a substantial volume of air will be drawn through opening 52 to mingle with the sampled stack gases and keep them in sufficient motion to minimize the deposition of particulates until the latter are trapped in filter 44.

The sensor apparently operates on the basis of charge transfer between the particles in the gas and the electrodes. While the exact mechanism is not fully understood, it has been observed that the current appears to be due to an interaction of the flowing particles with the electrodes, apparently the impingement of a proportionate number of particles on an un-grounded electrode. It is believed that the current flow is specifically due to the pick-up of electrons from the center electrode by most varieties of particles, although it has also been observed that some types of particulate matter appear instead to donate electrons, causing a current flow in the opposite direction. While a return path for current flow is provided by the grounded electrode, it is not necessary that any particular spacing be provided between the electrodes, at least for that purpose. Indeed, one can insulate the interior wall of tube 24 adjacent bullet 48, in which case the metallic wall of tube 24 further downstream or at pump 42 will serve as the electrode connected to system ground, without substantially altering the magnitude of the current flow.

It is also believed that the rate of charge transfer is proportional to the total surface area of the particles flowing past the ungrounded electrode and is also related to the triboelectric properties of these particles.

Because for a reasonably quasi-static distribution of particles of known material and sizes, the total particle surface area can be related to mass, the resulting current flow can be empirically related to the mass. The current flow ranges typically from the nanoampere magnitude (about $10 \times 10^{-9}$ amps) to a fraction of picoamperes (about $0.1 \times 10^{-12}$ amperes), depending on the mass flow rate of particles through the sensor and the sensor dimensions. The very small current observed is substantially insensitive to the temperature of the sensor. Gas velocity however is temperature variable and hence will cause current variations. The current is substantially linear with respect to the square of the velocity of the particles and is also substantially linear with respect to the total number or mass of particles. The sensor appears quite capable of detecting particles in the submicron range, for it exhibits a response to suspensions of particles known to be in the submicron range such as cigarette smoke in a quite low concentration. Ambient mass loading levels of about $1 \times 10^{-4}$ grains/SCF yield typically currents around magnitude of 0.1 picoampers for typical stack gas velocities e.g., from 1,000 to 10,000 feet/min.

As noted, the relation between current and mass, particularly mass per unit volume, is empirical. To obtain the relationship from the raw data of stack gas differential pressure observed at meter 29 and temperature observed at thermocouple 74, one first turns to the empirical chart shown at FIG. 2, selects an oridinate according to the value of $\Delta P_1$ read on meter 29, and then proceeds along that ordinate to the curve identified by the temperature read on meter 78. The value of the abscissa taken at the intersection of the selected ordinate and temperature curve of FIG. 2 is then the stack gas velocity in distance/unit time.

With that value of stack gas velocity in distance/unit time as the ordinate selected in FIG. 3, one proceeds along the ordinate to the appropriate curve identified by the temperature of the stack gas as determined by thermocouple 74 and displayed on meter 78. The value of the abscissa taken at the intersection of the selected ordinate and temperature curve of FIG. 3 is then the value of the sensor flow rate, preferably in standard cubic feet per minute. It is understood that the use of the charts presupposes that all readings have been achieved as previously described at equilibrium, and particularly, that $\Delta P_2$ has been made equal to $\Delta P_1$. Of course, the curves of FIG. 3 are valid only for a particular configuration and size of tube 24 and sensor 46 and needs be redetermined for each new model.

Figure 2:
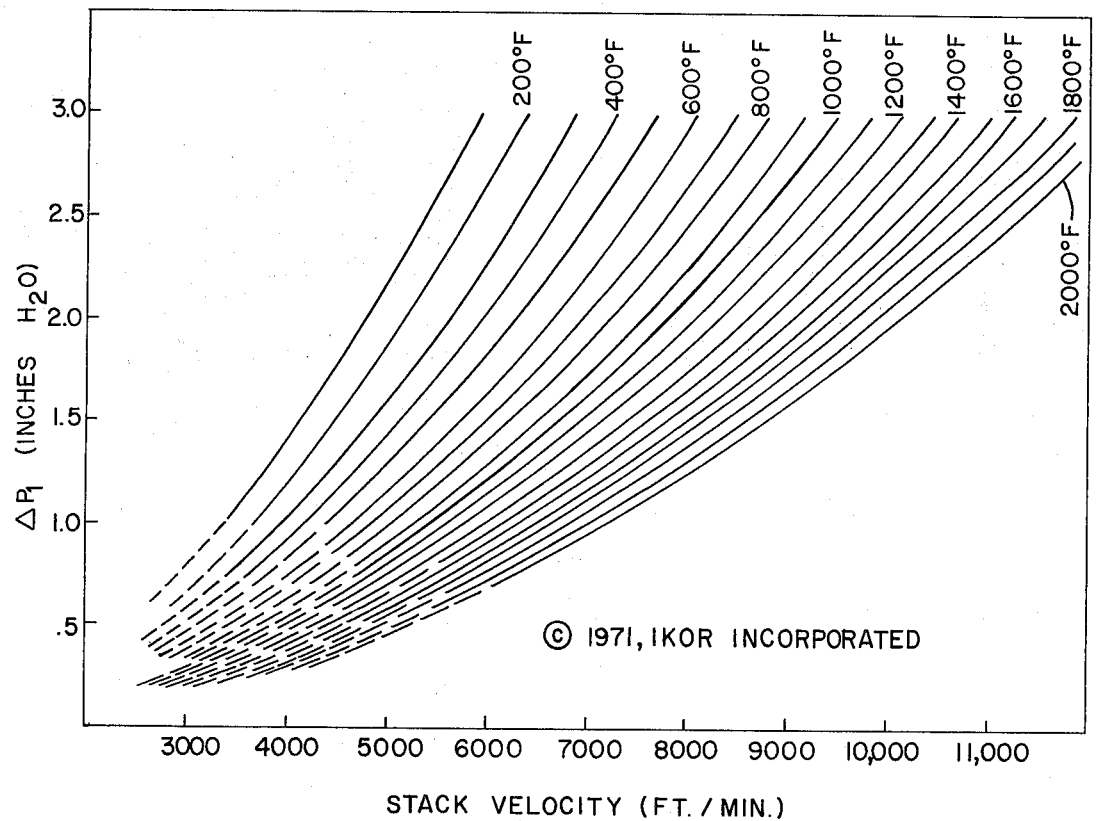
FIG. 2 is a graphical representation showing a number of curves, each for a different temperature of stack velocity in terms of $\Delta p$ vs. stack velocity in feet/minute.

It will be readily apparent that the chart of FIG. 2 permits one to convert a pressure differential into a temperature-corrected flow velocity, and the chart of FIG. 3 permits conversion of that flow velocity of the stack gas into a temperature-corrected volumetric flow rate through the sensor.

Now one can compute the mass flow rate of particulate matter (e.g., grains/min.) through the sensor using the following empirical relationship:

$$\text{Grains/min} = (ER/GV^2)\beta$$

where
- $R$ is the percentage of fullscale reading of meter means 64;
- $E$ is a constant based upon certain physical characteristics of the particulate material passing through the sensor;
- $G$ is the system gain usually determined by an amplifier forming part of meter 64;
- $V$ is the temperature-corrected flow velocity of gas through the Venturi as determined from a chart such as FIG. 2; and
- $\beta$ is a temperature correction factor defined as:

$$\beta = [(Tst)/(Tse)]^2$$

where $Tst$ is the stack gas absolute temperature and $Tse$ is the sensor gas absolute temperature.

As noted the response of sensor 46 varies according to a sensitivity constant $E$, and this latter is believed to be based on the triboelectric properties of the particulate matter in the sample stream. It has been found that, based upon some arbitrary sensitivity constant such as for example, a value for alumina of 1.3, other sensitivity constants can readily be determined. Thus, on such basis, graphite is about 2.7, fuel oil is about 2.2, rock dust is about 1.1 and so on. Using such sensitivity constants, one can set the scale of meter 64 and can calibrate it readily in a linear manner against the mass flow rate of a specific type of particulate matter contained by the sampled gases.

To determine finally the mass loading of the gas passing through the sensor, turning to the chart of FIG. 4, one selects an ordinate determined by computation of mass flow rate as noted above, and proceeds along that ordinate until arriving at the curve identified according to the value of the sensor flow rate taken from the chart of FIG. 3. The value of the abscissa where the computed ordinate and selected sensor flow rate curve intersect, is the mass loading of the sample and thus of the stack gas, typially in grains/standard cubic foot.

It will be apparent to those skilled in the art that the computations above described can be reduced for a given system to nomographs or readily performed in an analog or appropriately programmed digital electronic computer.

It will also be apparent to those skilled in the art that, although the operation of the system has been described in connection with a manual control and visual observation of meters 29 and 40, electronic control means shown schematically as block 68 can also be provided for controlling the speed of pumping of pump 42. Thus means 68 is shown connected by dotted lines 70 and 72 to meters 29 and 40 for automatically controlling pump 42 so as to servo the pressure detected at meter 40 to that detected at meter 29. The signals provided to the various meters can be readily digitized in analog-to-digital converters and the entire operation controlled and computed by an appropriately programmed computer.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. Method of sensing particulate matter in a gas flow and comprising the steps of:
    isokinetically sampling a portion of said gas flow;
    flowing said portion between at least two spaced-apart electrodes, one of said electrodes being grounded;
    determining the volumetric rate of flow of said portion between said electrodes;
    measuring that current flow occuring between said electrodes which is due to the transfer of charge between the other of said electrodes and particulate matter moving in said portion, said electrodes having substantially no other potential impressed therebetween, and;
    determining, as a function of said current flow and of said volumetric rate of flow, the mass flow rate of said particulate matter between said electrodes.

2. Method as defined in claim 1 wherein said mass flow rate ($R_{mf}$) is determined substantially in accordance with the relationship $$R_{mf} = (ER/GV^2) \beta$$

where
  $E$ is a constant based upon characteristics of the particulate matter passing between said electrodes,
  $R$ is a factor dependent linearly upon the magnitude of said current flow,
  $G$ is a multiplication factor.
  $V$ is the flow velocity of said gas flow, and
  $\beta$ is a temperature correction factor based upon the absolute temperatures of said flow and said portion.

3. Method as defined in claim 1 including the step of determining the mass loading of particulate matter per unit volume of said portion of gas, as a function of said mass flow rate and said volumetric rate.

* * * * *